2,800,711
Patented July 30, 1957

2,800,711
BRAZING METHOD

Lester E. Oliphant, Detroit, and Robert L. Peaslee, Royal Oak, Mich., assignors to Wall Colmonoy Corporation, Detroit, Mich., a corporation of Delaware No Drawing. Application August 18, 1954,
Serial No. 450,792

8 Claims. (Cl. 29—494)

The present invention relates to the art of brazing, soldering or joining of metals. The invention more specifically relates to a brazing method capable of improving the wetting and bonding action of the brazing metal on the base metal.

The art of brazing as it is commonly known employs a yellow brass-like aloy for the joining of steel or iron parts. With copper, tinned steel, tinned copper, and others, a white alloy of tin and lead is utilized. In both cases, fluxes, etc, are employed to assist wetting and flow. For applications wherein the brazed or soldered joint must withstand higher temperatures, so-called "silver solder" or pure silver itself is utilized as a brazing metal. For the brazing of stainless steels, "Inconel" and other high melting, corrosion-resistant metals and alloys, various alloys of nickel, chromium, boron, manganese, silicon and others have been employed with considerable success. However, in using any of these high melting brazing alloys, precautions have to be exercised to control the composition of the atmosphere during brazing. In most cases, a pure dry hydrogen atmosphere having a dew point of —50° F. or lower is utilized. In many cases, certain of these corrosion-resistant materials contain small proportions of aluminum, titanium and other metals which are added to make the alloys more resistant to high temperatures, to corrosion and the like. For example, the commercial alloys known as "Inconel X" are a very difficult-to-braze material. It is known that they contain up to 2.75% or more titanium. Likewise, certain steels contain up to 1.0% of aluminum and 2.5 or 3% titanium. Both Inconel X and aluminum- and titanium-containing steels are very difficult to braze due to a thin self-protective oxide film which readily forms on their surfaces and prevents wetting by the molten brazing alloy.

Other especially difficult-to-braze materials are the nitrided or nitroloy steels and high nitrogen stainless steels. These materials are not readily wet by any of the high melting brazing alloys.

In accordance with the present invention, however, any of the conventional brazing metals, alloys, solders, etc. can easily be applied to the base metal by carrying out the brazing operation in the presence of the vapors of one of the alkali metals such as lithium, sodium, potassium, rubidium and cesium. The vapors of metallic lithium are particularly efficacious in rendering the base metal more readily wet by the molten alloy. The higher temperature brazing operations, that is those carried out at temperatures above about 1000–1200° F., are particularly benefited by the presence of the lithium vapor.

In the method of this invention, a small quantity of the alkali metal is placed in the brazing muffle, retort, etc. in a position wherein at least a portion thereof will be vaporized and the vapors thereof allowed to come in contact with the specimen while it is being brazed. The vapors will condense on the cooler portions of the apparatus and can be collected and reused. It is not known with certainty, but it is believed that only a very small proportion of the lithium or other alkali metal vapor is actually consumed by reaction with the metal parts being brazed or with the brazing alloy itself. Most of the lithium which reacts, or which is adsorbed during brazing, is believed to be given off again during the process. While the alkali metals have boiling points between about 760 and 1600° C., it is not necessary actually to boil the alkali metal in order to obtain an atmosphere containing the desired metal vapor content. Lithium, in particular, appears to have the ability to sublime or give off vapors quite readily at temperatures well below its boiling point, especially in an evacuated atmosphere at a pressure of about 200 microns. The effective concentration required in the brazing atmosphere is not known with any greater precision than that there must be present a small amount of elemental lithium or other alkali metal vapor in the retort, furnace, or muffle during the brazing operation. Not only is it possible with this method to more readily and satisfactorily braze difficult-to-braze or previously impossible-to-braze metals and alloys, but also known brazing metals and alloys can be applied to a wider variety of base metals with a greater facility.

The process of this invention is considerably facilitated by evacuating the retort, muffle or brazing furnace. Extremely low vacuums of the order of $5 \times 10^{-5}$ mm. Hg are not required as in some metal welding or brazing processes wherein high vacuum degassing of the metal is required before wetting and proper flow can be obtained. In most cases, a simple mechanical vacuum pump which can reduce the pressure to about 100 microns is usually sufficient. Operation at a pressure between 200 and 800 microns is entirely satisfactory. The reduced pressure is believed (1) to remove oxygen from the retort and prevent its reaction with the metal, and (2) to facilitate the vaporization of the alkali metal. After the retort, furnace, or other apparatus has been evacuated, the vacuum pump can be shut off, the retort disconnected and the brazing completed.

The present process is also facilitated by carrying out the brazing in an atmosphere of inert or reducing gases. For this purpose there may be utilized pure dry hydrogen, argon, helium, combustion gases, nitrogen, cracked ammonia, and others. The use of combustion gases, nitrogen or cracked ammonia, while generally satisfactory with non-ferrous metals, is not recommended where nitrogen absorption or nitriding action would be objectionable. Inert or reducing gases protect the metal surfaces against oxidation during the exposure to high temperature. The process is, however, operative with lithium or other alkali metal vapors in air or other gas.

The invention will now be illustrated by a number of specific examples which are intended to be illustrative only.

Example 1

Strips of a commercially-pure form of titanium were brazed together with pure silver metal at 1550 to 1590° F. in an elongated metal retort under a partial vacuum of about 200 microns. The specimen was at heat for five minutes. A small crucible containing several grams of metallic lithium was placed in the retort in a hot zone in such a manner that the air or gas being evacuated carried the metal vapors over the work before leaving the retort. Most of the lithium condensed out on a baffle in a cooler zone in the retort. In this experiment, it should be noted that a temperature of only 1550–1590° F. was required. Pure silver melts, ordinarily, at 1760° F. It is apparent that the presence of lithium vapors lowered the effective melting point of the silver brazing metal. In addition, inspection of the welded joint revealed excellent flow and wetting by the silver brazing metal and that a moderate fillet extended the entire length of the joint. The brazing of titanium metal at lower temperatures preserves better ductility in the base metal and produces a tougher joint. The joint prepared as above had a shear strength of 29,000 lbs./sq. in. and showed better ductility than when brazed by other methods at higher temperatures. Heretofore, the surface of titanium metal was one of the most difficult surfaces to wet with a liquid or molten brazing metal or alloy.

*Example 2*

Stainless steel or chrome-nickel-iron alloys which contain about 1% aluminum are very difficult to braze materials. Ordinarily this type of metal is brazed with a commercial nickel-chromium alloy known as "Nicrobraz" and the brazing operation is usually carried out under pure dry hydrogen at 1950 to 2150° F. In this experiment, however, the brazing was carried out by placing the powdered "Nicrobraz" around the joint, placing the assembly in a retort along with a small crucible containing metallic lithium, the retort sealed and then evacuated down to a pressure of between 200 and 800 microns while applying heat. A temperature of about 2000° F. was required to cause the "Nicrobraz" to flow into the joint. The resulting brazed joint showed excellent wetting, flow and an excellent bond. In contrast, without the lithium vapors slightly higher temperatures are required to braze stainless steel, careful control of a dry hydrogen atmosphere is required, and occasional defective joints are obtained due to improper wetting and flow by the brazing alloy.

*Example 3*

A nickel-chrome alloy known as "Inconel X" which contains about 2.75% titanium and about 1% aluminum was brazed to stainless steel Type 330. These two metals are particularly difficult to braze. The brazing alloy employed was "Nicrobraz" and the temperature again was about 2000° F. Metallic lithium was present in the retort as in previous examples. An excellent joint was obtained in each case.

*Example 4*

A eutectic nickel-chrome alloy known as "LM Alloy" was used to braze stainless steel to stainless steel with the specimen at 1850° F. for one minute in the presence of lithium vapors. The flow and alloying or bond between the base metal and the brazing alloy was good.

*Example 5*

Titanium was brazed to titanium using pure aluminum as the brazing metal. The brazing was carried out at 1150° F. in the retort described above in the presence of metallic lithium vapors. In this experiment, an extremely difficult-to-wet metal was joined to itself without fluxes or other special precautions. Since aluminum itself is reported to melt at about 1220° F., it is readily apparent that the presence of lithium vapors lowered the melting point by between 50 and 70° F. In addition, wetting and flow by the molten aluminum was exceptionally good.

*Example 6*

Titanium was brazed to stainless steel using pure silver as the brazing metal. Brazing was carried out at a pressure between 200 and 800 microns in the presence of lithium vapor and the brazing temperature was 1550° F. An excellent joint was obtained. Likewise, a silver-tin alloy was used to braze titanium to iself at 1400° F. A sound joint was obtained.

*Example 7*

Copper was brazed to titanium using pure silver as the brazing metal. The brazing temperature was 1550° F. in an evacuated retort containing lithium vapors. The joint was well filled, showed excellent flow and wetting and was strong and tough.

*Example 8*

A carbon steel having a nitrided wear resistant surface was brazed to ordinary steel using pure silver as the brazing metal. Brazing was carried out, as before, at 1550° F. in an evacuated retort in the presence of lithium vapors. The joint obtained was smooth, showed good wetting and flow, and was otherwise entirely satisfactory. Wetting and flow of any brazing metal in contact with nitrided steel is most difficult to obtain in the absence of metallic lithium vapors.

What is claimed is:

1. A method of brazing metals which comprises placing the metal surfaces to be joined with brazing metal adjacent thereto, together with a quantity of metallic lithium, in a sealed retort, evacuating the said retort to a pressure of at least as low as 200 microns Hg, and heating the evacuated retort to a brazing temperature sufficient to vaporize the said metallic lithium at the pressure existing in said retort and to cause the brazing metal to flow between surfaces and effect a bond therebetween.

2. The method as defined in claim 1 wherein the metal brazed is a stainless steel, the brazing metal is an alloy of nickel and chromium, and the evacuated retort is heated to a temperature of about 2000° F.

3. The method as defined in claim 1 wherein a nitrided steel surface is brazed to a surface of ordinary steel, the brazing metal is substantially pure silver, and the evacuated retort is heated to a temperature of about 1550° F.

4. A method of brazing metals which comprises placing the metal surfaces to be joined with a silver brazing metal adjacent thereto, together with a quantity of metallic lithium, in a sealed retort, evacuating the said sealed retort to a pressure of at least as low as 200 microns Hg, and heating the said sealed retort to a brazing temperature above about 1000° F. to cause said metallic lithium to vaporize and alloy with the silver brazing metal whereby the alloy will flow between said surfaces and effect a bond therebetween.

5. A method of brazing a difficult-to-braze titanium-containing metal which comprises placing a brazing metal selected from the class consisting of silver and aluminum adjacent the surfaces to be joined, placing the resulting assembly, together with a quantity of metallic lithium, in a sealed retort, evacuating the said sealed retort to a pressure of at least as low as 200 microns Hg, and heating the evacuated retort to a brazing temperature above about 1000° F. to cause the said lithium metal to vaporize and alloy with the brazing metal so that the alloy will flow between said surfaces and effect a bond therebetween.

6. The method as defined in claim 5 further characterized in that a titanium surface is brazed to another titanium surface, the brazing metal is substantially pure silver, and the evacuated retort is heated to a temperature within the range of 1550 to 1590° F.

7. The method as defined in claim 5 further characterized in that a titanium surface is brazed to another titanium surface, the brazing metal is substantially pure aluminum, and the evacuated retort is heated to a temperature of about 1150° F.

8. The method as defined in claim 5 and further characterized in that a titanium metal surface is brazed to a copper surface, the brazing metal is substantially pure silver, and the evacuated retort is heated to a temperature of about 1550° F.

References Cited in the file of this patent

UNITED STATES PATENTS

| | | |
|---|---|---|
| 1,753,509 | George | Apr. 8, 1930 |
| 2,095,807 | Gier | Oct. 12, 1937 |
| 2,181,092 | Ness | Nov. 21, 1939 |
| 2,235,965 | Ness | Mar. 25, 1941 |
| 2,491,284 | Sears | Dec. 13, 1949 |
| 2,713,196 | Brown | July 19, 1955 |